United States Patent [19]

Mizuno et al.

[11] Patent Number: 5,022,704
[45] Date of Patent: Jun. 11, 1991

[54] STRUCTURE OF AN AUTOMOBILE BODY IN THE VICINITY OF A ROOF PANEL, A REAR FENDER PANEL AND A QUARTER PANEL AND INCLUDING A REINFORCEMENT MEMBER

[75] Inventors: Eiichi Mizuno; Noritaka Sakiyama; Yukito Matsui; Yoshikazu Kono; Kiyoshige Yamada, all of Hiroshima, Japan

[73] Assignee: Mazda Motor Corporation, Hiroshima, Japan

[21] Appl. No.: 348,643

[22] Filed: May 8, 1989

[30] Foreign Application Priority Data

May 10, 1988 [JP] Japan .................. 63-61336[U]
May 25, 1988 [JP] Japan .................. 63-69063[U]

[51] Int. Cl.⁵ .............................................. B62D 25/08
[52] U.S. Cl. ........................... 296/195; 296/30; 296/203
[58] Field of Search ............ 296/195, 203, 29, 30, 296/187, 198, 204

[56] References Cited

U.S. PATENT DOCUMENTS

| | | | |
|---|---|---|---|
| 3,661,419 | 5/1972 | Mitamura et al. | 296/195 X |
| 4,004,124 | 1/1977 | Nakane et al. | 296/187 |
| 4,234,225 | 11/1980 | Harasaki et al. | 296/185 |
| 4,272,120 | 6/1981 | Katayama et al. | 296/195 X |
| 4,444,428 | 4/1984 | Iwakura et al. | 296/153 |
| 4,634,173 | 1/1987 | Aonuma et al. | 296/195 X |

FOREIGN PATENT DOCUMENTS

| | | | |
|---|---|---|---|
| 209439 | 12/1982 | Japan | 296/195 |
| 146475 | 9/1986 | Japan . | |
| 282172 | 12/1986 | Japan | 296/195 |

*Primary Examiner*—Margaret A. Focarino
*Assistant Examiner*—Andrew C. Pike
*Attorney, Agent, or Firm*—Wenderoth, Lind & Ponack

[57] ABSTRACT

An automobile rear body structure includes a roof panel, for forming an upper surface of a roof portion of a vehicle body, which is provided with an integrally formed downwardly extending portion to form an outer surface of a rear pillar at a rear side portion thereof. The rear body structure also includes a rear fender panel joined to a lower end of the downwardly extending portion for forming an outer surface of a rear side wall, a quarter panel located inside the rear fender panel, and a reinforcement member for connecting the rear fender panel and the quarter panel at a location near a lower end of the rear pillar. The reinforcement member may be formed by bending the rear fender panel inwardly from a joint between the rear fender panel and the downwardly extending portion of the roof panel. Alternatively, the reinforcement member may be formed of a separate reinforcement element.

20 Claims, 9 Drawing Sheets

STRUCTURE OF AN AUTOMOBILE BODY IN THE VICINITY OF A ROOF PANEL, A REAR FENDER PANEL AND A QUARTER PANEL AND INCLUDING A REINFORCEMENT MEMBER

BACKGROUND OF THE INVENTION

1. Field of the Invention

The present invention generally relates to an automobile body structure, and more particularly, to the structure of an automobile rear body in the vicinity of rear pillars and rear fenders.

2. Description of the Prior Art

Conventionally, an automobile rear body structure includes rear fender panels which form outer surfaces of the side walls of the rear portion of an automobile. Each of the rear fender panels is provided, in the vicinity of a rear portion of a room compartment, with an upwardly extending portion forming an outer surface of each rear pillar.

The Japanese Utility Model Laid-Open Application No. 61-146475 discloses one example of the upwardly extending portion of the rear fender panel, the upper end of which is bent inwardly and joined to a roof panel which forms an upper surface of a roof portion of the automobile body.

In this rear body structure, however, the upwardly extending portion of the rear fender panel and the roof panel must be tightly joined to each other so as to form a strong bond along the entire joint to prevent rain water or the like from entering the room compartment. Accordingly, spot welding, which is superior in workability, can not be used. Rather, MIG welding or the like is generally employed to provide a continuous weld.

Because of this, the conventional automobile rear body structure is not easily assembleable and requires a relatively large number of man-hours to assemble. The manufacturing costs therefor are thus relatively high.

It has, therefore, been proposed to eliminate the need for MIG welding by forming a downwardly extending portion, which constitutes the outer surface of the rear pillar, at a rear side portion of the roof panel and by joining the lower end of the downwardly extending portion to the rear fender panel. However, this structure results in a body structure having insufficient rigidity.

SUMMARY OF THE INVENTION

Accordingly, the present invention has been developed in order to substantially eliminate the above described disadvantages inherent in the prior art automobile rear body structures, and has for its essential object to provide an improved rear body structure in which a roof panel and a rear fender panel can be readily joined to each other in a manner which increases manufacturing efficiency.

Another important object of the present invention is to provide an automobile rear body structure of the above described type in which a joint between the roof panel and the rear fender panel is kept high in rigidity.

In accomplishing these and other objects, an automobile rear body structure according to one preferred embodiment of the present invention includes a roof panel for forming an upper surface of a roof portion of a vehicle body and provided with an integrally formed downwardly extending portion to form an outer surface of a rear pillar at a rear side portion thereof, a rear fender panel joined to a lower end of the downwardly extending portion for forming an outer surface of a rear side wall, a quarter panel located inside the rear fender panel, and a reinforcement portion for connecting the rear fender panel and the quarter panel at a location near a lower end of the rear pillar.

The reinforcement portion may be formed by bending the rear fender panel inwardly from a joint between the rear fender panel and the downwardly extending portion of the roof panel. Alternatively, the reinforcement portion may comprise a separate reinforcement element which defines a substantially closed section between it and the quarter panel.

In the above described construction, since the downwardly extending portion constituting the outer surface of the rear pillar is integrally formed with the roof panel constituting the upper surface of the roof portion of the vehicle body, it is not necessary to employ MIG welding or the like, which is inferior in workability and requires a considerable number of man-hours to perform. Rather spot welding, which is superior in workability and requires less man-hours than MIG welding, can be employed.

Furthermore, the joining structure between the rear fender panel and the quarter panel at the lower end of the rear pillar forms the reinforcing portion in the vicinity of the joint between the downwardly extending portion of the roof panel and the rear fender panel. This greatly enhances the rigidity of the joining portion and does not increase the production costs.

In addition, since a space inside the side wall and a space inside the rear pillar at a rear portion of the vehicle body are separated from each other at a location near the rear pillar, very little of the noise generated in the vicinity of a rear wheel or rear suspension is transmitted to the roof portion through the rear pillar. This significantly reduces noise inside the room compartment.

BRIEF DESCRIPTION OF THE DRAWINGS

These and other objects and features of the present invention will become more apparent from the following description with reference to the accompanying drawings, throughout which like parts are designated by like reference numerals, and wherein.

DETAILED DESCRIPTION OF THE PREFERRED EMBODIMENTS

Several embodiments of the present invention will now be explained with reference to the drawing figures.

Embodiment 1

Figure 2:
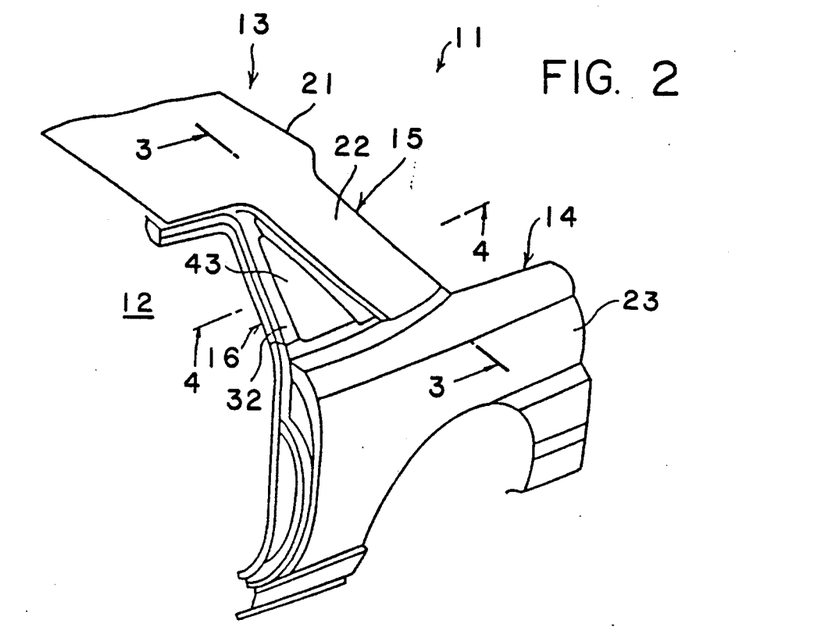
FIG. 2 is a perspective view of the structure of FIG. 1.

As shown in FIG. 2, an automobile rear body structure comprises a roof portion 13 located at an upper portion of a room compartment 12, a pair of side walls 14, and pairs of rear pillars 15 and center pillars 16 for connecting the roof portion 13 and the side walls 14.

Figure 1:
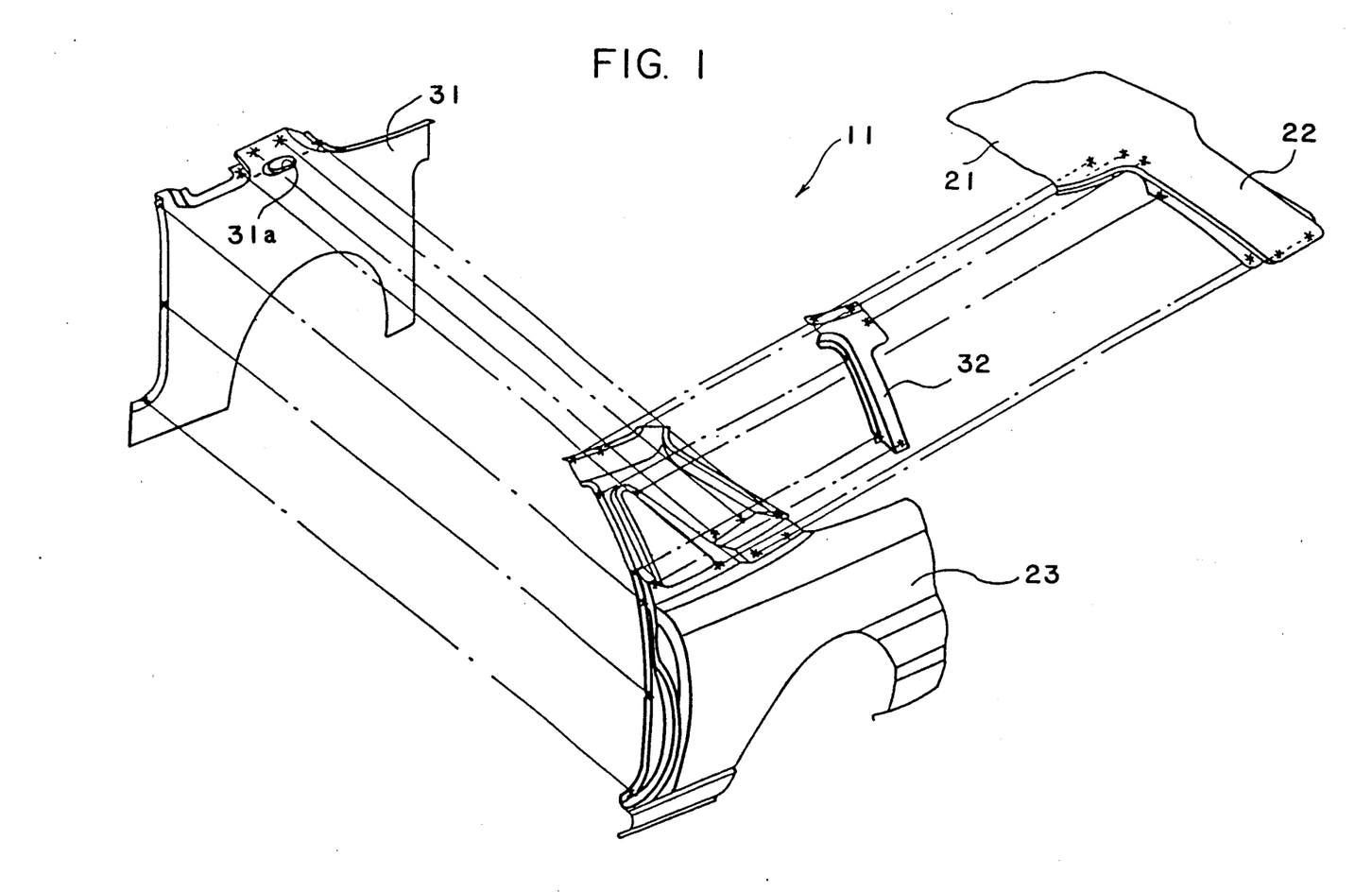
FIG. 1 is an exploded perspective view of an automobile rear body structure according to a first embodiment of the present invention.

The upper surface of the roof portion 13 comprises a roof panel 21, which is provided with a pair of downwardly extending portions 22 constituting respective outer surfaces of the rear pillars 15, as shown in FIG. 1. The lower end of each downwardly extending portion 22 is joined to a rear fender panel 23 which constitutes an outer surface of the side wall 14. A sealant 24 is coated on the lower end of the downwardly extending portion 22 to prevent water from entering a gap between the downwardly extending portion 22 and the rear fender panel 23.

Figure 3:
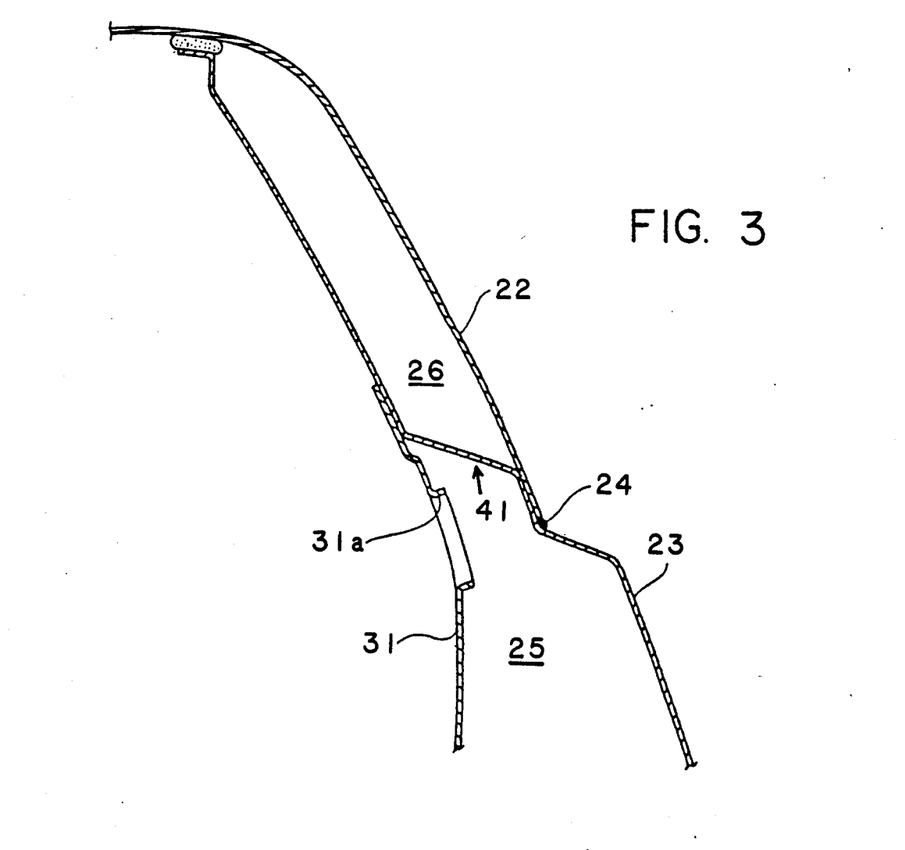
FIG. 3 is a sectional view taken along the line 3—3 in FIG. 2.

As shown in FIG. 3, the rear fender panel 23 is bent inwardly of the vehicle body at the portion thereof joined to the downwardly extending portion 22, i.e. in the vicinity of the lower end of the rear pillar 15. The rear fender panel 23 is also joined to a quarter panel 31 provided inside the rear fender panel 23. The rear fender panel 23 extends upwardly from its inwardly bent portion, i.e. from the portion thereof which is joined to the quarter panel 31, to form a rear pillar inner member which constitutes an inner surface of the rear pillar 15.

Figure 4:
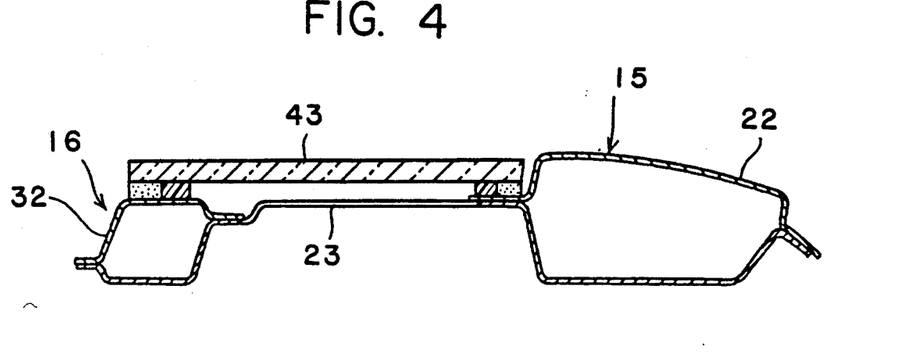
FIG. 4 is a sectional view taken along the line 4—4 in FIG. 2.

The rear fender panel 23 is joined at its bent portion to the downwardly extending portion 22 of the roof panel 21 (as stated previously) to form the rear pillar 15 and to a center pillar outer panel 32 to form the center pillar 16, as shown in FIG. 4.

The center pillar outer panel 32 is further joined at its upper end to the roof panel 21 and at its lower end to the rear fender panel 23. The outer surface of the center pillar outer panel 32 is covered partially by a side windowpane 43.

An opening 31a is formed in the quarter panel 31 at a location inwardly of the joint between the downwardly extending portion 22 of the roof panel 21 and the rear fender panel 23. An electrode may be brought into contact, through the opening 31a, with the rear fender panel 23 from the inside of the vehicle body after the downwardly extending portion 22 and the rear fender panel 23 have been joined to each other.

In the above described construction, since the downwardly extending portion 22 constituting the outer surface of the rear pillar 15 is integrally formed with the roof panel 21, it is not necessary to employ MIG welding or the like in order to prevent the ingress of water such as rain water or the like into the room compartment 12. Accordingly, the rear body structure of the present invention is easy to assemble and the man-hours required for such assembly are reduced.

Furthermore, the rigidity of the rear pillar 15 is increased in the vicinity of its lower end due to the fact that the quarter panel 31 is joined to the rear fender panel 23 in the vicinity of the lower end of the rear pillar 15 and a reinforcement member 41 is formed in the vicinity of the joint between the downwardly extending portion 22 of the roof panel 21 and the rear fender panel 23. Because of this, the vehicle body can be manufactured with sufficient rigidity and without any increase in costs.

Additionally, a space 25 formed inside the side wall 14 and a space 26 formed inside the rear pillar 15 are separated from each other by the inwardly bent portion (reinforcement member 41) of the rear fender panel 23 at the lower end of the rear pillar 15. Accordingly, very little of the noise generated at a rear wheel or rear suspension located substantially below the inwardly bent portion is transmitted upwardly from the rear pillar 15. This significantly reduces noise inside the room compartment 12.

Both the joint between the center pillar outer panel 32 and the roof panel 21 and the joint between the center pillar outer panel 32 and the rear fender panel 23 are covered by the side windowpane 43, as well as by the center pillar outer panel 32. Because of this, appearance of the vehicle rear body is barely affected when spot welding or the like is employed.

Embodiment 2

Figure 5:
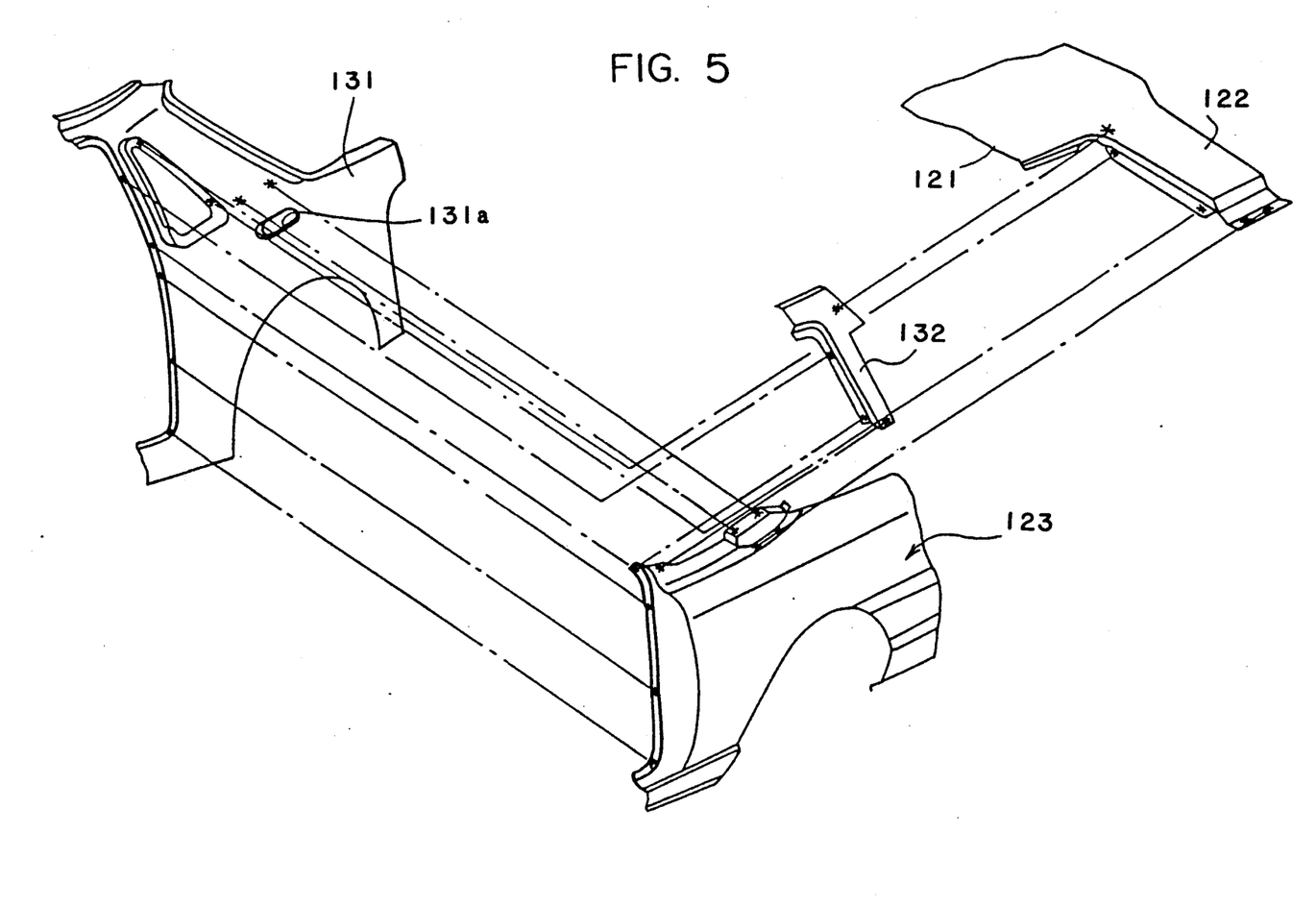
FIG. 5 is an exploded perspective view of an automobile rear body structure according to a second embodiment of the present invention.
Figure 6:
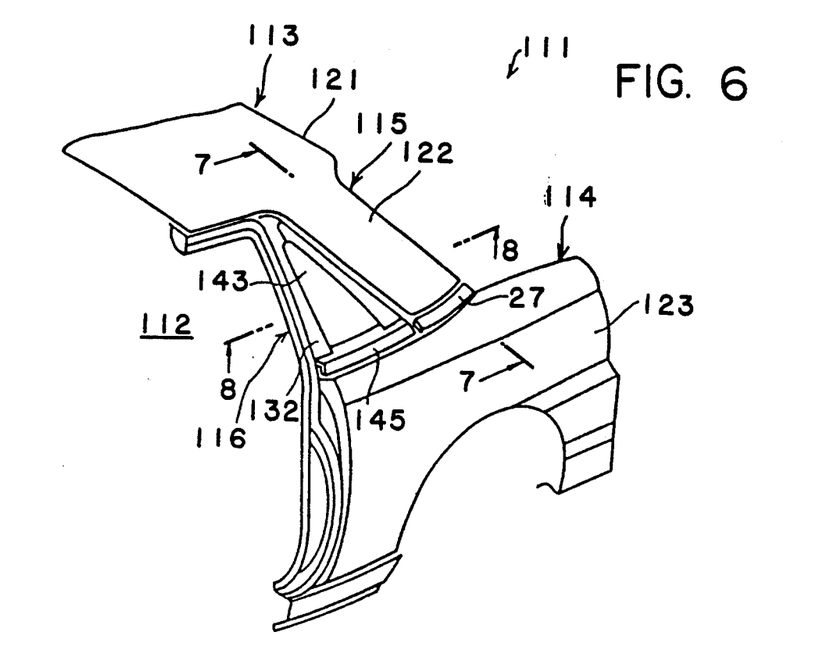
FIG. 6 is a perspective view of the structure of FIG. 5.
Figure 7:
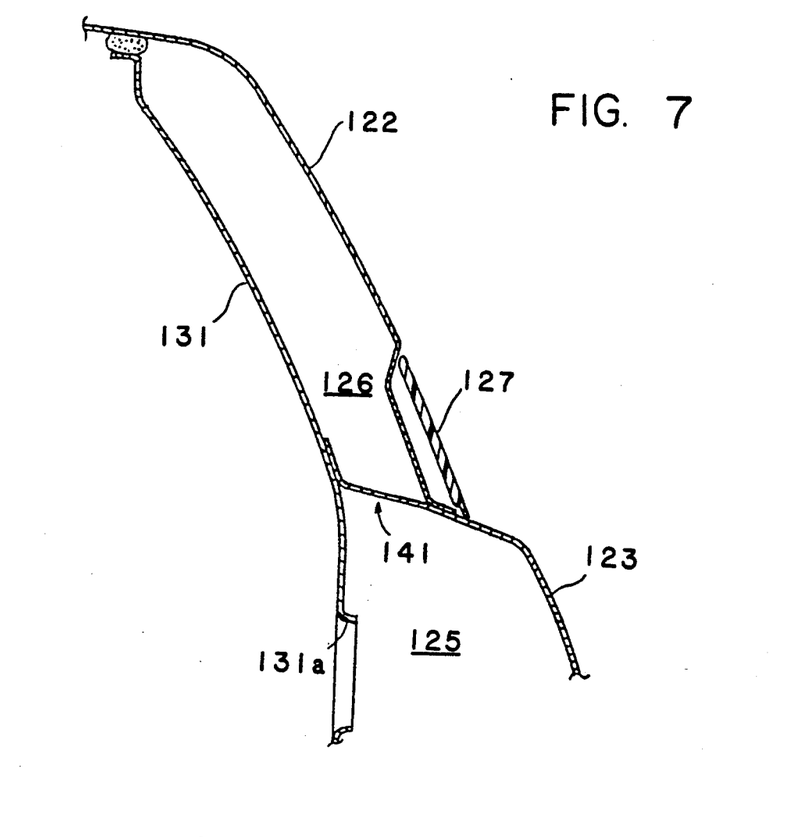
FIG. 7 is a sectional view taken along the line 7—7 in FIG. 6.

As shown in FIG. 5, the lower end of a downwardly extending portion 122 of a roof panel 121 is bent inwardly of the vehicle body and is joined to a rear fender panel 123. A belt-line molding 127 is mounted as a decorative member outside the bent portion of the downwardly extending portion 122, as shown in FIGS. 6 and 7, to cover the joint between the downwardly extending portion 122 and the rear fender panel 123 from the outside.

The rear fender panel 123 is bent inwardly at a location in the vicinity of its joint with the downwardly extending portion 122, i.e. in the vicinity of the lower end of a rear pillar 115, to form a reinforcement member 141. The rear fender panel is also joined to a quarter panel 131 provided inside the rear fender panel 123. The quarter panel 131 extends upwardly from the joint thereof with the rear fender panel 123 to constitute the inner surface of the rear pillar 115.

Figure 8:
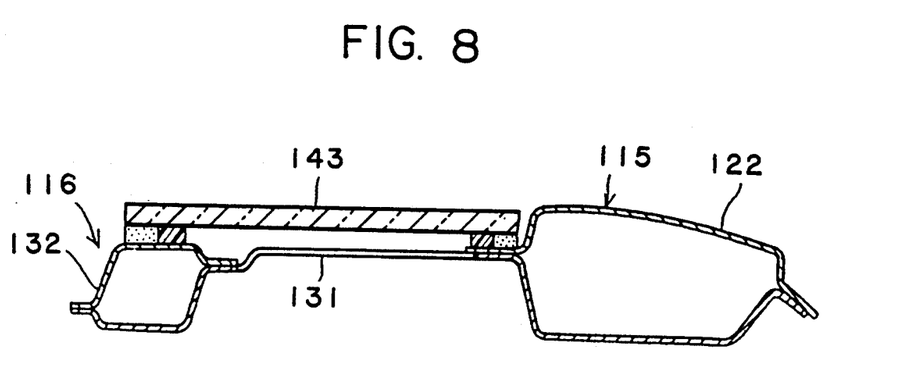
FIG. 8 is a sectional view taken along the line 8—8 in FIG. 6.

The quarter panel 131 is joined at its upwardly extending portion to the downwardly extending portion 122 of the roof panel 121 to form the rear pillar 115 and to a center pillar outer panel 132 to form a center pillar 116, as shown in FIG. 8.

The center pillar outer panel 132 is further joined at its upper end to the roof panel 121 and at its lower end to the rear fender panel 123. The center pillar outer panel 132 is covered by a side windowpane 143 from the outside.

Along the lower edge of the side windowpane 143 is mounted a belt-line molding 145 similar to the belt-line molding 127 which covers the joint between the downwardly extending portion 122 of the roof panel 121 and the rear fender panel 123.

The above described construction of Embodiment 2 results in the same advantages as does that of Embodiment 1. Furthermore, in the construction of Embodiment 2, since the joint between the downwardly extending portion 122 of the roof panel 121 and the rear fender panel 123 is covered by the belt-line molding 127, it is not necessary to finish a welding line even when spot welding is employed. The downwardly extending portion 122 of the roof panel 121 may even be bolted to the rear fender panel 123. Accordingly, the number of man-hours required to assemble the rear body structure is further reduced without diminishing the appearance thereof.

Embodiment 3

Figure 9:
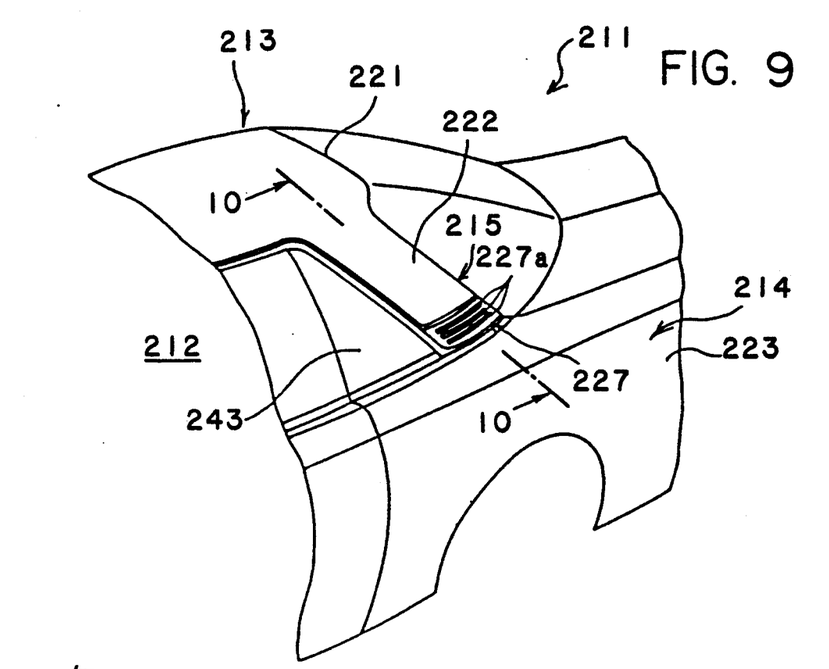
FIG. 9 is a perspective view of an automobile rear body structure according to a third embodiment of the present invention.

In this embodiment, a belt-line molding 227 for covering the lower end of a downwardly extending portion 222 of a roof panel 221 from the outside is in the form of a grill having a plurality of slits 227a, as shown in FIG. 9.

Figure 10:
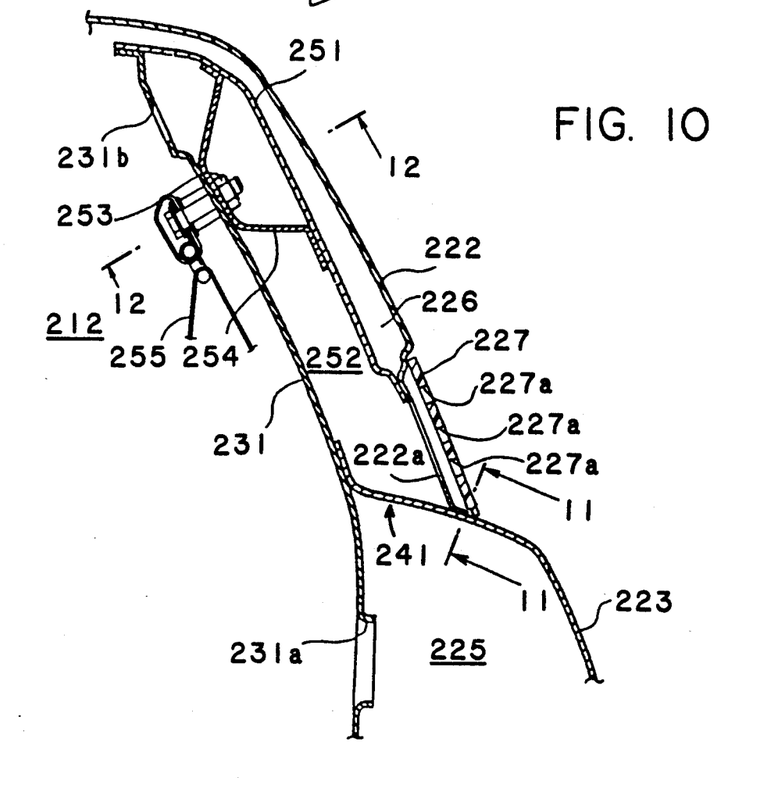
FIG. 10 is a sectional view taken along the line 10—10 in FIG. 9.
Figure 11:
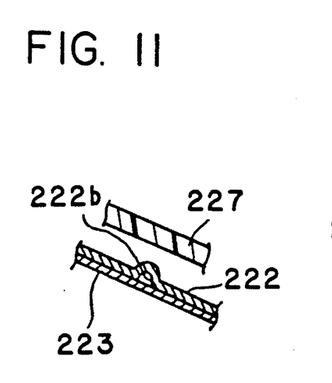
FIG. 11 is a sectional view taken along the line 11—11 in FIG. 10.

FIG. 10 depicts a section of a rear pillar 215, in which an opening 222a is formed in the vicinity of the lower end formed at an upper portion of a quarter panel 231. FIG. 11 depicts a drainage hole 222b formed at the joint between the lower end of the downwardly extending portion 222 and a rear fender panel 223.

Figure 12:
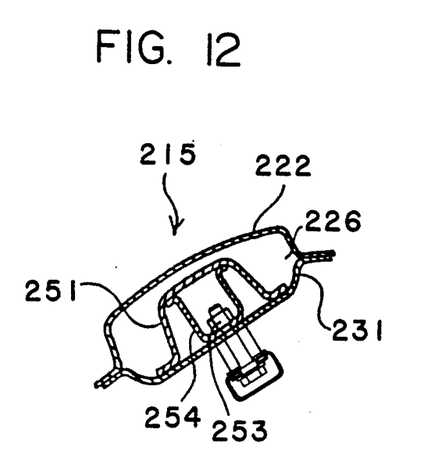
FIG. 12 is a sectional view taken along the line 12—12 in FIG. 10.

As shown in FIG. 12, a chamber panel 251 to be secured to the quarter panel 241 is provided between the downwardly extending portion 222 and the quarter panel 231 and forms an extra chamber 252 so that air inside the room compartment 212 may be discharged through the openings 231b and 222a and the chamber 252.

The chamber panel 251 is joined at its lower end to the downwardly extending portion 222. An anchor mounting bolt and nut 253 for a seat belt mount device 255 is rigidly secured to a reinforcement panel 254 and an upper portion of the quarter panel 231, thereby rigidly securing the upper portion of the quarter panel 231 to the reinforcement panel 254. The reinforcement panel 254 is, in turn, secured to the chamber panel 251.

In such a construction, the lower portion of the extra chamber 252 is formed by the rear fender panel 223 with no opening therein through which moisture or the like from the air discharged from the inside of the room compartment 212 can flow into a space 225 defined between the rear fender panel 223 and the quarter panel 231. Accordingly, in addition to the advantages of Embodiment 1, the extra chamber 252 is formed inside the rear pillar 215 without increasing the chances of rust forming within the space 225 between the rear fender panel 23 and the quarter panel 231.

Embodiment 4

Figure 13:
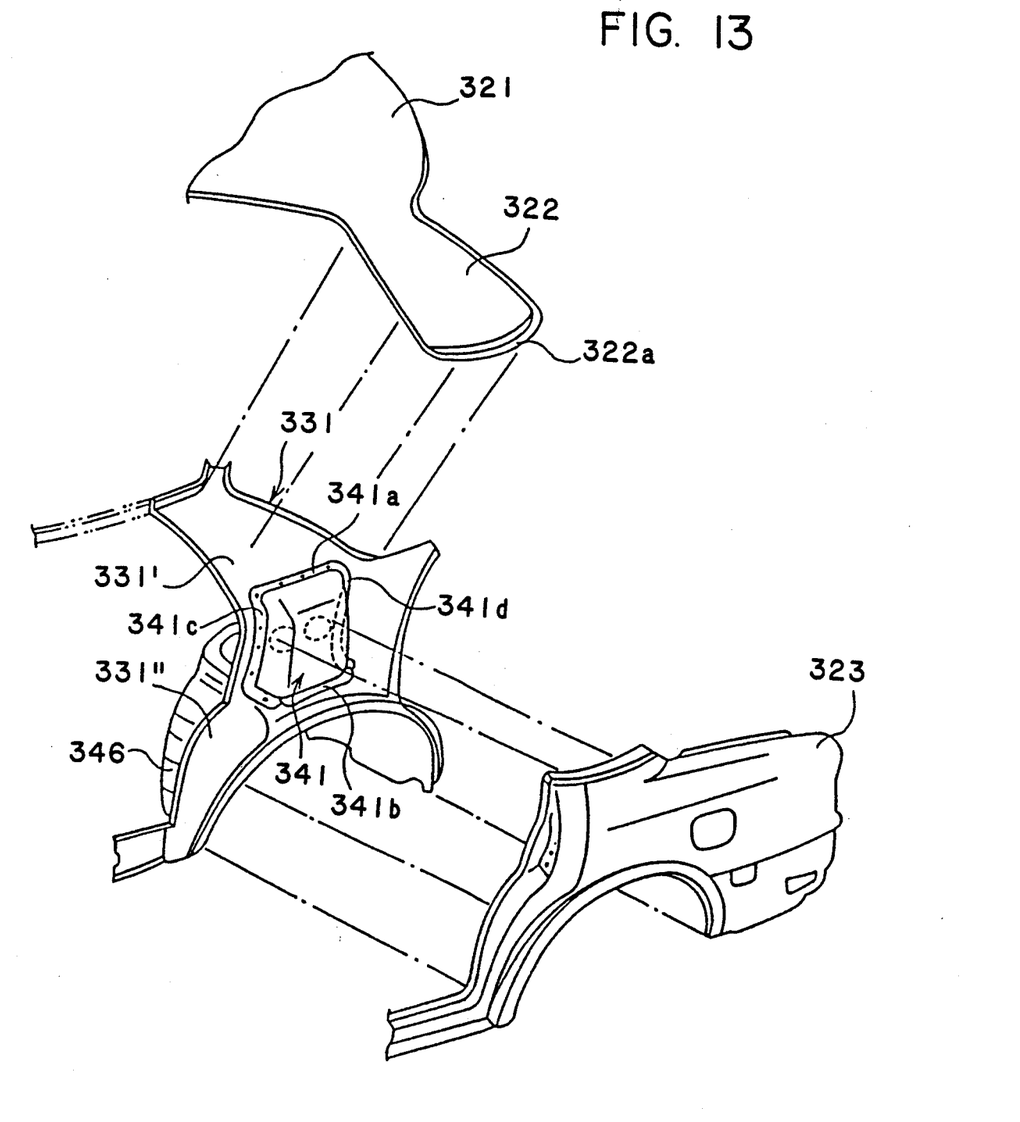
FIG. 13 is an exploded perspective view of an automobile rear body structure according to a fourth embodiment of the present invention.
Figure 15:
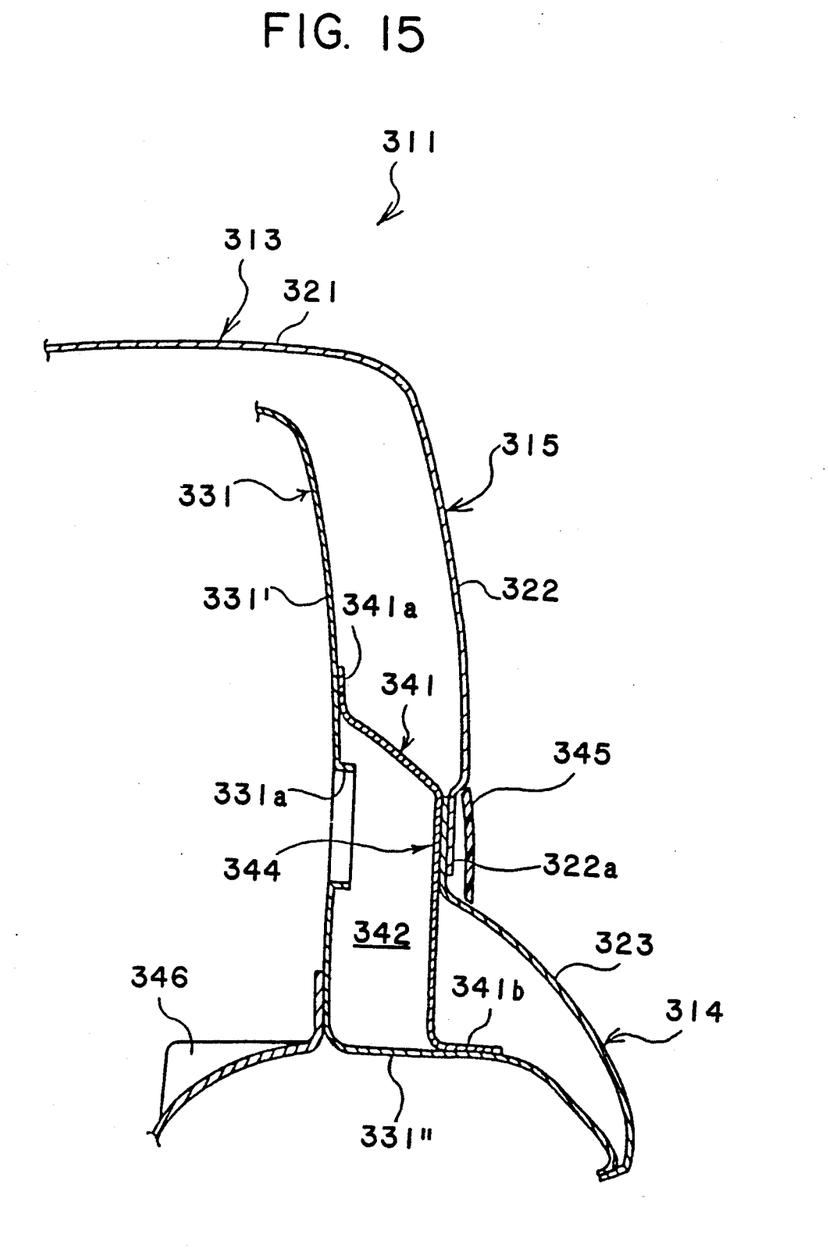
FIG. 15 is a sectional view taken along the line 15—15 in FIG. 14.
Figure 16:
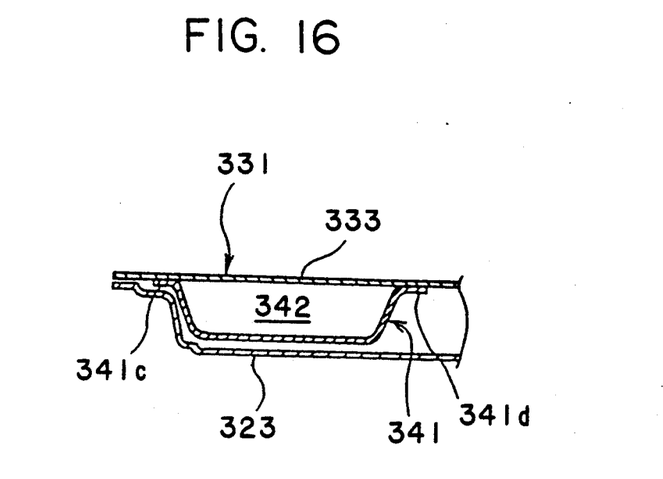
FIG. 16 is a sectional view taken along the line 16—16 in FIG. 14.

As shown in FIGS. 13 and 15, a quarter panel 331 comprises a rear pillar portion 331' located inside a downwardly extending portion 322 of a roof panel 321 and a rear fender portion 331" located inside the rear fender panel 323. A reinforcement element 341 is provided between the quarter panel 331 and a continuous plane formed by the downwardly extending portion 322 of the roof panel 321 and the rear fender panel 323. The reinforcement element 341 is joined at its upper end 341a to the rear pillar portion 331' and at its lower end 341b to the rear fender portion 331" so that a chamber 342 may be defined between the reinforcement element 341 and the quarter panel 331. Also, as shown in FIG. 16, the reinforcement element 341 is joined at its front and rear ends 341c and 341d to the quarter panel 331 to further define the chamber 343.

Figure 14:
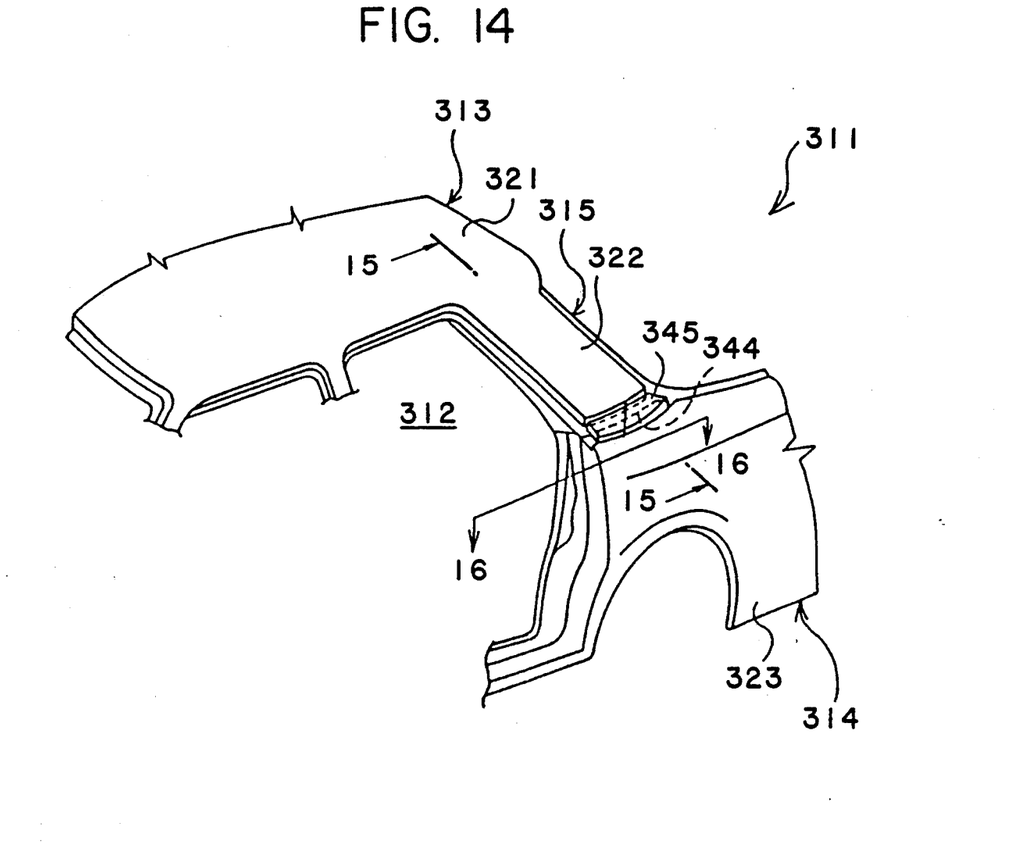
FIG. 14 is a perspective view of the structure of FIG. 13.

A joint 344 between the downwardly extending portion 322 of the roof panel 321 and the rear fender panel 323 is further joined to the reinforcement element 341. A molding member 345 is provided outside this joint 344, as shown in FIGS. 14 and 15. An opening 331 is formed in the rear pillar portion 331' of the quarter panel 331 inwardly of the joint 344 for providing access to perform work as described above in connection with Embodiment 1.

A wheel housing inner member 346 is joined to an inner portion of the rear fender portion 331" of the quarter panel 331 to cover a rear wheel (not shown).

In such a construction, the downwardly extending portion 322 of the roof panel 321, the rear fender panel 323 and the reinforcement element 341 are joined to one another by spot welding. This spot welding can be readily performed by bringing one welding electrode into contact with the joint portion 344 from the outside and the other electrode into contact therewith from inside through the opening 331a of the rear pillar portion 331' of the quarter panel 331.

Furthermore, all the joining work between the reinforcement 341 and the quarter panel 331, that between the downwardly extending portion 322 of the roof panel 321 and the rear pillar portion 331' of the quarter panel 331, that between the rear fender panel 323 and the rear fender portion 331" of the quarter panel 331, and that between the rear fender portion 331" of the quarter panel 331 and the wheel housing inner member 346 can be readily carried out by spot welding. Thus, the manufacturing efficiency is improved.

As stated above, the reinforcement element 341 and the quarter panel 331 together define the chamber 342 as shown in longitudinal section in FIG. 15 and transverse cross section in FIG. 16. In addition, since joint the between the downwardly extending portion 322 of the roof panel 321 and the rear fender panel 323 is further joined to the reinforcement element 341, the vehicle body 311 is highly rigid in the vicinity of the rear pillar 315.

Accordingly, the rigidity of the vehicle body can be increased without increasing the number of man-hours necessary to assemble the vehicle body.

Moreover, the need for finishing work on the spot welding can be eliminated by providing the molding member 345 outside the joint 344, thus further simplifying the assembling process.

In addition, a space defined by the downwardly extending portion 322 of the roof panel 321 and the rear pillar portion 331' of the quarter panel 331 is partitioned into an upper portion and a lower portion by the reinforcement element 341. This greatly reduces the noise transmitted from the roof portion 313 to the room compartment 312.

As is clear from the foregoing description, according to the present invention, not only can the assembly process for joining the downwardly extending portion of the roof panel to the rear fender panel be made easier, but man-hours required therefor can be reduced.

Also, the joint between the downwardly extending portion and the rear fender panel is highly rigid according to the invention, thus rendering the vehicle body sufficiently rigid without increasing the production costs therefor.

In addition, noise in the room compartment is significantly reduced by preventing noise generated in the vicinity of the rear wheel or rear suspension from being transmitted to the roof portion.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile rear body structure comprising:
   a roof panel, for forming an upper surface of a roof portion of a vehicle body, provided with an integrally formed downwardly extending portion to form an outer surface of a rear pillar at a rear side portion thereof;
   a rear fender panel, joined to a lower end of said downwardly extending portion to form a joint therebetween, for forming an outer surface of a rear side wall;
   a quarter panel spaced from said rear fender panel; and
   a reinforcement member for connecting said rear fender panel and said quarter panel at a location near a lower end of said rear pillar.

2. The automobile rear body structure according to claim 1, wherein an opening required for joining said rear fender panel to the lower end of said downwardly extending portion is formed in said quarter panel.

3. The automobile rear body structure according to claim 2, wherein said reinforcement member is formed by bending said rear fender panel away from said joint formed between said rear fender panel and said downwardly extending portion.

4. The automobile rear body structure according to claim 3, wherein said rear fender panel extends upwardly from said reinforcement member to form a rear pillar inner member.

5. The automobile rear body structure according to claim 3, wherein said quarter panel extends upwardly beyond said reinforcement member to form a rear pillar inner member.

6. The automobile rear body structure according to claim 3, wherein a drainage hole is formed in said joint.

7. The automobile rear body structure according to claim 3, further comprising a rear pillar inner member joined to said reinforcement member, and a seat belt mounting device mounted to said rear pillar inner member.

8. The automobile rear body structure according to claim 3, further comprising a decorative member covering said joint.

9. The automobile rear body structure according to claim 8, further comprising a rear pillar inner member joined to said reinforcement member and having at least one ventilation opening formed therein, and wherein at least one ventilation opening is formed in said downwardly extending portion.

10. The automobile rear body structure according to claim 9, wherein said ventilation opening in said downwardly extending portion is concealed by said decorative member.

11. The automobile rear body structure according to claim 10, wherein said decorative member is provided with a plurality of slits.

12. The automobile rear body structure according to claim 2, wherein said reinforcement member is formed as a separate element.

13. The automobile rear body structure according to claim 12, wherein a space is formed between said rear fender panel and said quarter panel, and said reinforcement element is joined to said quarter panel so as to form a chamber within said space and separated from a remainder of said space.

14. The automobile rear body structure according to claim 1, wherein said reinforcement member is formed as a separate element.

15. The automobile rear body structure according to claim 14, wherein a space is formed between said rear fender panel and said quarter panel, and said reinforcement element is joined to said quarter panel so as to form a chamber within said space and separated from a remainder of said space.

16. The automobile rear body structure according to claim 1, wherein said reinforcement member is formed by bending said rear fender panel away from said joint formed between said rear fender panel and said downwardly extending portion.

17. The automobile rear body structure according to claim 1, wherein said rear fender panel extends upwardly from said reinforcement member to form a rear pillar inner member.

18. The automobile rear body structure according to claim 17, wherein a first space is formed between said rear fender panel and said quarter panel, a second space is formed between said rear pillar inner member and said downwardly extending portion, and said reinforcement member separates said first space from said second space.

19. The automobile rear body structure according to claim 1, wherein said quarter panel extends upwardly beyond said reinforcement member to form a rear pillar inner member.

20. The automobile rear body structure according to claim 19, wherein a first space is formed between said rear fender panel and said quarter panel, a second space is formed between said rear pillar inner member and said downwardly extending portion, and said reinforcement member separates said first space from said second space.

* * * * *